Figure 1:
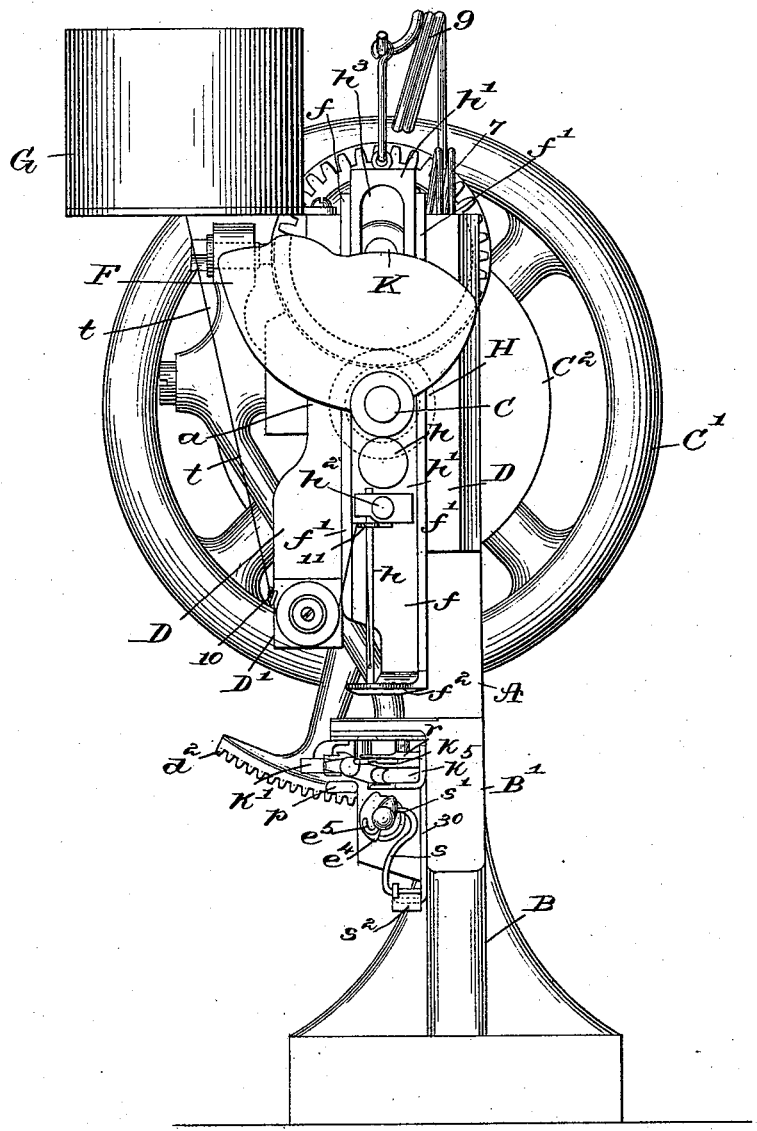

(No Model.)  6 Sheets—Sheet 1.

W. H. BORDEN.
KNOT TYING MACHINE.

No. 493,205.  Patented Mar. 7, 1893.

Witnesses.
Edward F. Allen.
Louis N. Gowell.

Inventor.
William H. Borden
by Crosby Gregory
Attys.

(No Model.) 6 Sheets—Sheet 2.

W. H. BORDEN.
KNOT TYING MACHINE.

No. 493,205. Patented Mar. 7, 1893.

Witnesses.
Edward F. Allen.
Louis N. Dowell.

Inventor.
William H. Borden
by Crosby & Gregory Attys.

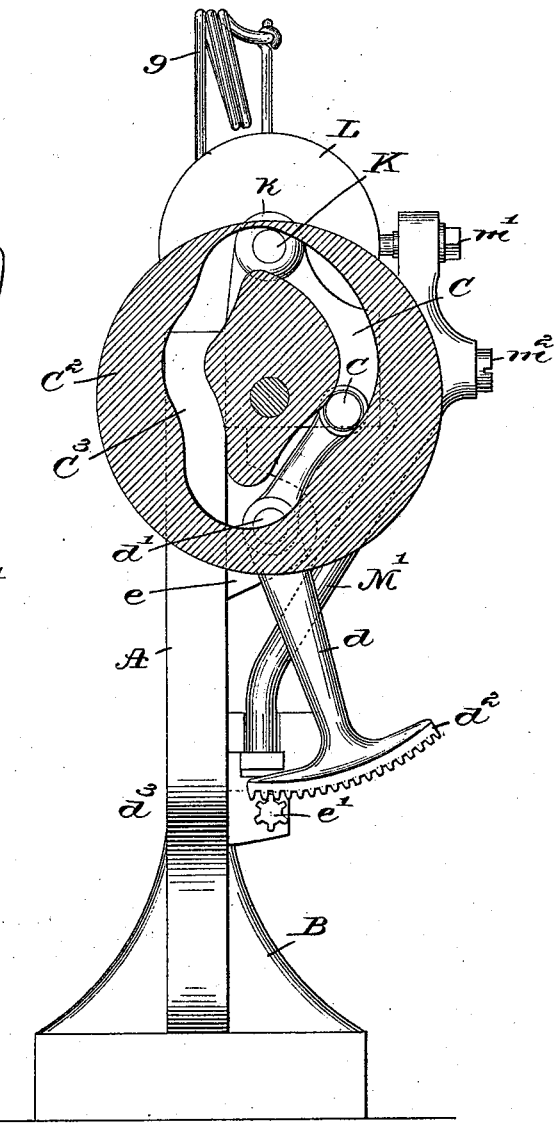

(No Model.) 6 Sheets—Sheet 4.
W. H. BORDEN.
KNOT TYING MACHINE.
No. 493,205. Patented Mar. 7, 1893.
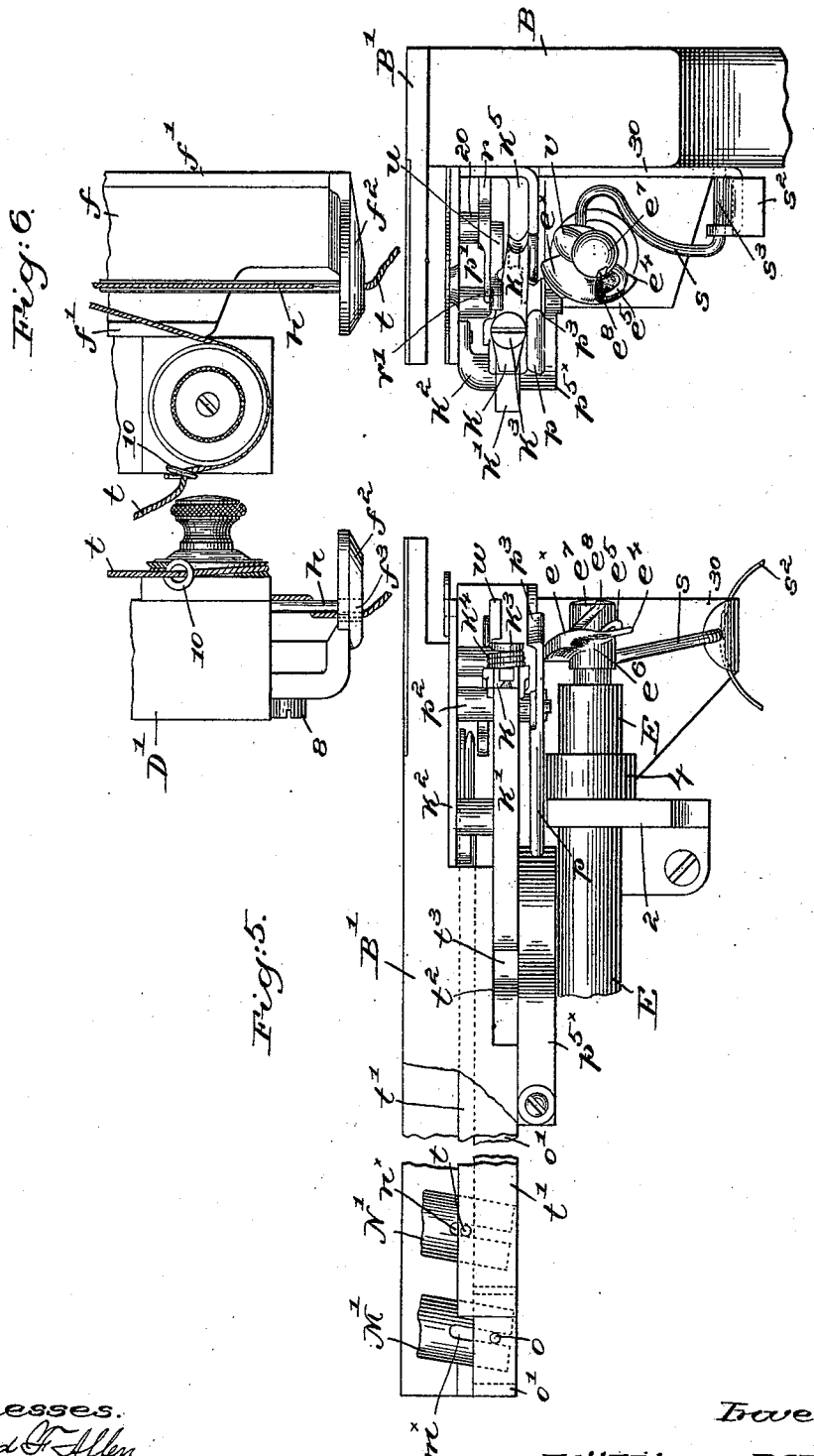
Witnesses.
Edward F. Allen.
Louis N. Gowell
Inventor.
William H. Borden
By Crosby & Gregory
attys.

(No Model.)  6 Sheets—Sheet 5.
W. H. BORDEN.
KNOT TYING MACHINE.
No. 493,205. Patented Mar. 7, 1893.
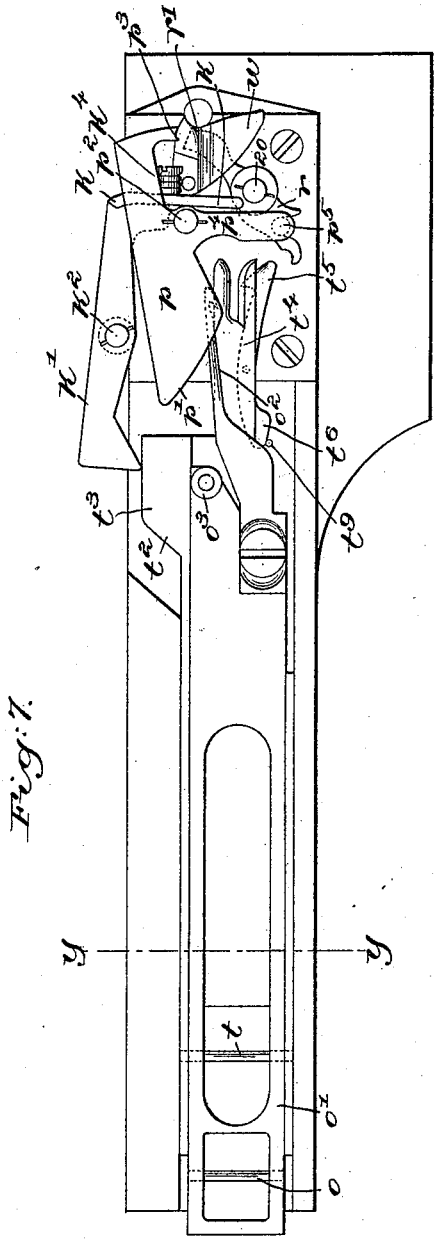
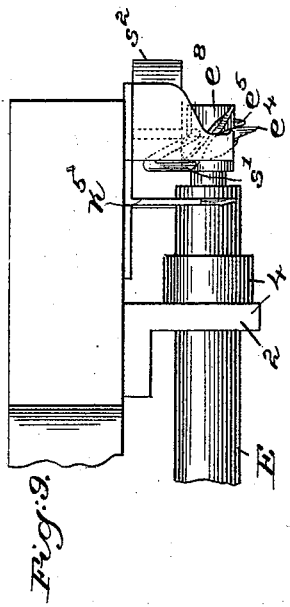
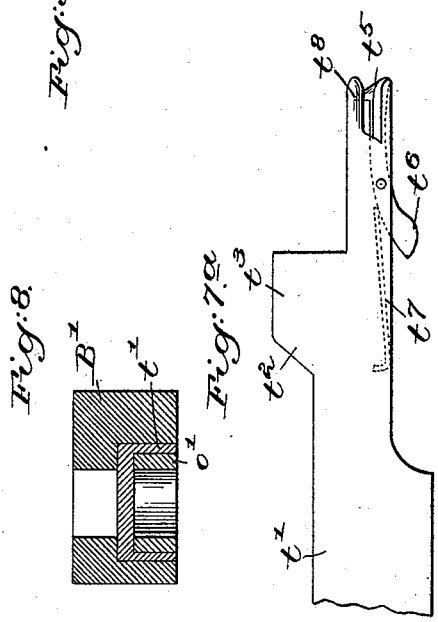
Witnesses.
Edward F Allen.
Louis N Dowell
Inventor.
William H. Borden
by Crosby Gregory
Attys (No Model.)
6 Sheets—Sheet 6.
W. H. BORDEN.
KNOT TYING MACHINE.
No. 493,205.
Patented Mar. 7, 1893.
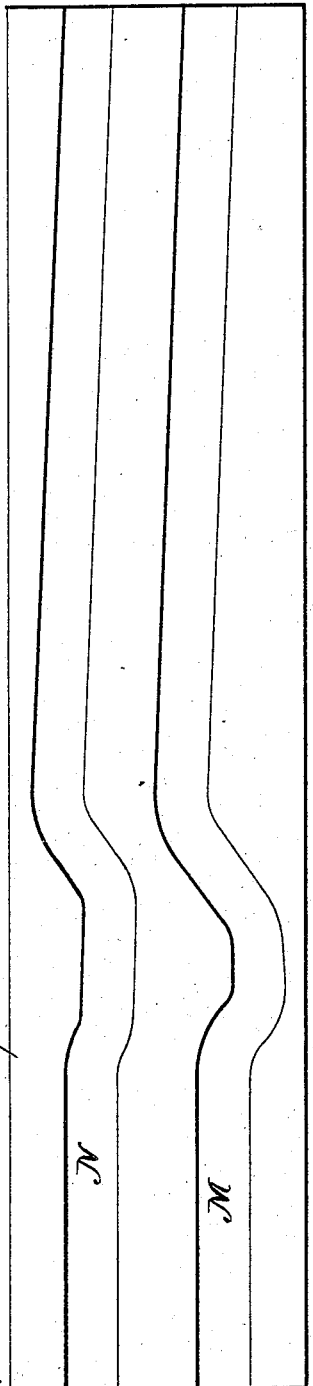
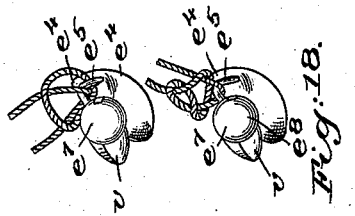
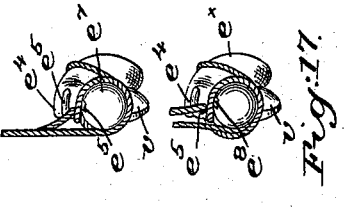
Witnesses.
Edward F. Allen
Louis N. Dowell
Inventor.
William H. Borden
By Crosby & Gregory
Attys.
THE NORRIS PETERS CO., PHOTO-LITHO., WASHINGTON, D. C.

UNITED STATES PATENT OFFICE.

WILLIAM H. BORDEN, OF LAWRENCE, MASSACHUSETTS, ASSIGNOR OF TWO-THIRDS TO HENRY F. MURRAY AND JAMES A. BROGAN, OF SAME PLACE.

KNOT-TYING MACHINE.

SPECIFICATION forming part of Letters Patent No. 493,205, dated March 7, 1893.

Application filed November 7, 1892. Serial No. 451,202. (No model.)

*To all whom it may concern:*

Be it known that I, WILLIAM H. BORDEN, of Lawrence, county of Essex, State of Massachusetts, have invented an Improvement in Knot-Tying Machines, of which the following description, in connection with the accompanying drawings, is a specification, like letters and figures on the drawings representing like parts.
Machines have heretofore been constructed for tying a knot in the ends of a cord inserted in the backs of shoes to connect them in pairs, and it is desirable that the knots can be readily untied, but in the machines heretofore constructed for such purposes, and known to me, the knots tied have been of such character that they could not be readily untied, and in order to separate the shoes the connecting cord had to be cut by a knife or other cutting implement. Such severance of the cord destroyed it, and furthermore, if the cutting implement were mislaid, delay and annoyance ensued both to customer and dealer.

This invention has for its object the production of a machine which will insert the cord in the back of one shoe of a pair and tie a slip knot in the end of the cord within the shoe, and then insert the cord in the other shoe and tie it, every alternate knot tied being the reverse of the intervening knots, whereby strain upon the cord between the knots will tighten them, while strain upon the loose end of each knot will quickly slip or untie it, the machine being provided with means for drawing out after every second knot a length of cord sufficient to form the next knot, and with means to sever the cord when so drawn out.

In accordance therewith, my invention consists in a knot-tying machine containing the following instrumentalities, viz:—an eye-pointed cord carrying needle to penetrate the material; a work support; a knotter located below the material and co-operating with said needle, and a cast-off to remove the main portion of the knot from the knotter, combined with a reversing or twisting device between the knotter and work support to engage and cross the two sides of the loop of cord held by the knotter intermediate it and the material, prior to the formation of every alternate knot, and actuating mechanism for the needle, knotter, and reversing or twisting device, substantially as will be described.

Also, in a knot-tying machine containing the following instrumentalities, viz:—a cord-carrying eye-pointed needle, a knotter located below and to co-operate with said needle, and a cast-off, combined with a reversing or twisting device to engage and cross the two sides of the loop at times while it is held by the knotter, and a cutting mechanism to sever the cord after the formation of every second knot, substantially as will be described.

Also, in a knot-tying machine containing the following instrumentalities, viz:—a cord carrying needle; and a knotter located below and co-operating with said needle, combined with fixed and movable blades having their cutting edges in a vertical plane parallel to and at one side of the needle path, a reciprocating hook adapted to engage the cord and draw taut a portion of the same to one side of and from the needle and between the cutting edges of the blades to be severed thereby, and blade-actuating mechanism, substantially as will be described.

Other features of my invention will be hereinafter described and particularly pointed out in the following claims.

Figure 2:
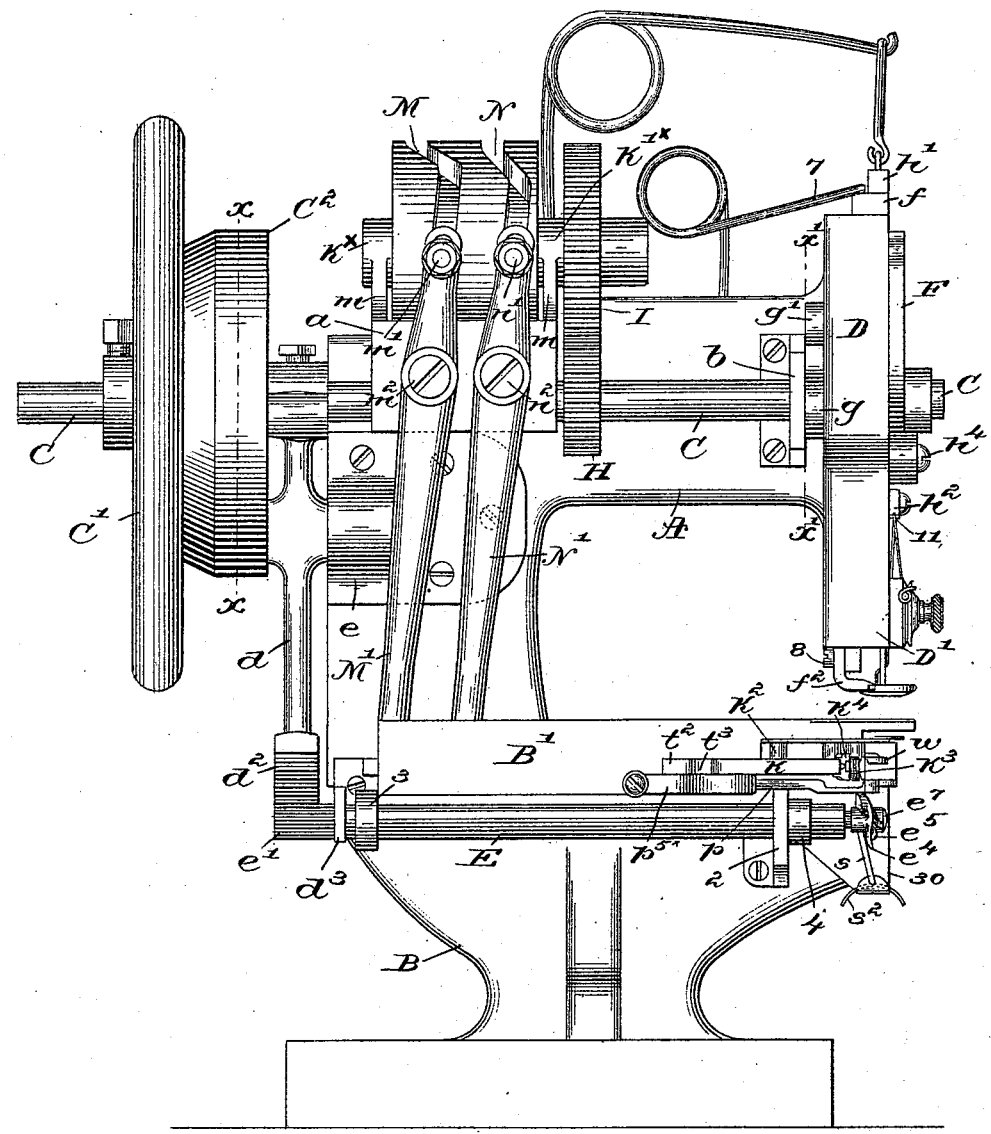

Figure 1 is a front elevation of a machine embodying this invention. Fig. 2 is a side elevation thereof, looking toward the right, Fig. 1, the cord receptacle being removed. Fig. 3 is a vertical sectional view on the line $x$—$x$, Fig. 2, looking toward the right. Fig. 4 is a section taken on the line $x'$—$x'$, Fig. 2. Figs. 5 and 6 are side and front views, respectively, on a larger scale, of the knotting mechanism shown in Figs. 1 and 2. Fig. 7 is an underside view of the top-plate, removed, with the loop-twisting or reversing mechanism and a portion of the cutting mechanism thereon. Fig. 7$^a$ is a detail to be described. Fig. 8 is a section on the line $y$—$y$, Fig. 7. Fig. 9 is a detached view looking down, of a portion of the knotter, and one of the cutters. Fig. 10 is a view of one of the cams, projected on a horizontal plane. Figs. 11 to 18 are detached views showing the formation of the knots step by step.

As shown in the drawings, the overhanging arm A rising from the base B and provided with suitable bearings $a, b$, for the main driving shaft C, has at its front end an enlarged head D, herein shown as longitudinally grooved on its outer face to receive the presser and needle-bars, to be described.

The shaft C has preferably secured to it at its rear end a suitable fly wheel $C'$, and a belt wheel $C^2$, having a cam groove $C^3$ in its inner face, see Fig. 3, entered by a roller or other stud $c$ on one arm of the sector lever $d$, pivoted at $d'$ preferably to an ear $e$ secured to or forming a part of the arm A, see Figs. 2 and 3, the other arm of the said lever terminating in a toothed sector $d^2$, in mesh with a pinion $e'$ fast on the knotter shaft E which is supported in bearings 1, 2, attached to the base B, and provided with suitable collars as 3, 4, to prevent longitudinal movement thereof.

The presser-bar $f$, herein shown as adapted to reciprocate in the grooved face of the head D, and provided with upturned longitudinal guides or flanges $f'$, is suitably slotted to receive the main shaft C, having a cam $g$ attached thereto, engaged by a roller or other stud, see Figs. 1 and 4, extended from the rear side of the presser-bar $f$ through a slot 6 in the head D, as best shown in Fig. 4, the cam $g$, raising the presser-bar against the pressure of a suitable spring 7, at the proper time, to admit or release the work, the said spring maintaining the presser-foot $f^2$ down upon the material during the tying of the knot.

As herein shown, the presser-foot, attached to the presser-bar by screws 8, is provided with a needle hole $f^3$, see dotted lines Fig. 5, to receive the eye-pointed awl-like needle $h$, secured to the needle-bar $h'$ by a suitable clamp $h^2$, and the said needle-bar, adapted to slide longitudinally on the presser-bar between the guides $f'$, is slotted at its upper end, as at $h^3$.

The needle-bar is provided upon its face with a roller or other stud $h^4$ held in engagement with a cam F, as herein shown, by a spring 9, the said cam being fast on the front end of the main shaft C, extended through the slots in the head, presser-bar, and needle-bar respectively.

A suitable cord receptacle or box G is shown in Fig. 1 as secured to the head of the machine, the cord $t$ being led from an opening therein through a guide-eye 10 around a tension device of usual construction supported by a depending ear or lug $D'$, to the eye 11 on the needle-bar and thence to the eye of the needle.

Referring now to Figs. 1 and 2, a gear H is shown as fast upon the shaft C, and in mesh with a larger gear I, having an extended hub $c^x$, and fast on the short shaft K, supported in suitable bearings $k^x$, $k'^x$, in the ears or extensions $m$ attached to or forming a part of the arm A, the said shaft having fast thereon a cam L provided with separate grooves M, N, in which enter rollers or other studs $m'$, $n'$, adjustable in the slotted ends of like levers $M'$, $N'$, pivoted at $m^2$, $n^2$, respectively, to the front of the box-like bearing $a$, the grooves M and N being shown produced in Fig. 10. The lower end of each lever $M'$, $N'$, is herein shown as forked or slotted, see Fig. 5, at $m^x$, $n^x$, the slot $m^x$ engaging, as herein shown, a pin $o$ at or near one end of a slide-bar $o'$ longitudinally movable in the base-plate $B'$ by or through the lever $M'$ and cam L. The slide-bar is provided at its forward end with a projecting finger $o^2$ having a hooked end, see Fig. 7, for a purpose to be described, and a roller or other stud $o^3$ is secured to the underside of said slide-bar to co-operate with a cam surface $p'$ forming a part of, and to actuate, the loop-twisting or reversing mechanism, consisting, as herein shown, see Figs. 5, 6, and 7, of a plate $p$ pivotally mounted on a suitable post or stud $p^2$ secured to the base plate, the front end of said plate $p$ being provided with a curved arm having an upright notch $p^3$ in its end, to engage one side of the loop formed by the needle in the formation of every alternate knot, to be described. The plate $p$ has an arm $p^4$ extended therefrom provided with a stud $p^5$ to engage the forked end of a lever $r$ pivoted at 20 to the base plate, the other end of said lever having a notch $r'$, see Figs. 6 and 7, to engage the other side of the needle-loop, and act in conjunction with the notch $p^3$, the sides of the loop being crossed after the loop has been entered by the loop-taker and loop-detainer, and before the looper has made a complete revolution in the formation of every second knot, in order that every other knot will be tied in the reverse direction from the intervening knots. A spring $p^{5x}$ keeps the plate $p$ normally in the position shown in Fig. 7. The knotter shaft E has thereon at its front end a knotter comprising a loop-taker $e^4$ to enter the loop of cord brought down by the needle below the material, and a loop-detainer, herein shown as a hook $e^5$, is located at one side of and inclined toward the loop-taker, the point of said loop-detainer approaching the adjacent side of the loop-taker but leaving sufficient space between them to admit one side of the loop in the operation of tying the knot, the opposite side of the loop-taker $e^4$ being cut away as at $e^6$ to co-operate with the rearwardly curved portion $e^x$ thereof which forms a loop-turner to turn one side of the loop over onto the hub-like portion $e^7$ of the shaft, in position to be engaged at the proper time by the cast-off, herein shown as a rocker arm $s$ pivotally supported in the depending arm 30, the upper end $s'$ of said rocker-arm resting in and being moved by a spiral groove $e^8$ in the hub $e^7$ of the shaft, the said arm being held against the hub by a spring $s^2$ acting upon a slightly off-set portion $s^3$ between the supports for the arm. As the upper end of said arm $s$ is moved from left to right, see Fig. 5, by the groove $e^8$, in the rotation of the knotter, it casts the loop off from the hub $e^7$, the part of the cord to thereafter form the bight or loop of the knot being momentarily held by the loop-detainer $e^5$, as will be described. A projection $v$ substantially opposite to the loop taker maintains a portion of the loop in proper position upon the hub while the knot is being formed.

Referring now to Figs. 5, 6 and 7, the slot $n^x$ in the end of lever N' engages a pin or projection $t$ on a slide bar $t'$, herein shown as recessed upon its underside, see Fig. 8, to receive and guide the bar $o'$ movable longitudinally and independently therein. The slide-bar $t'$ has at one end thereof a cam surface having a rise $t^2$ and a dwell $t^3$ to actuate a lever $k'$ pivoted to a suitable stud $k^2$. The movable cutting blade $k$ grooved and beveled at its cutting end, is secured to one end of the lever $k'$ in a yielding manner by a suitable screw $k^3$ surrounded by a spring $k^4$, between the head of said screw and the blade $k$, the said blade being held by the spring yieldingly against the fixed cutting blade $k^5$, see Figs. 6 and 9, the end of said fixed blade having a groove therein, shown in dotted lines Fig. 6, to receive and hold the cord, the end of the blade being extended to form a bearing or guide for the movable blade $k$. As the side bar is reciprocated the lever $k^5$ will be turned on its pivot to move the blade $k$ over the fixed blade at the proper time to sever the thread between their ends or cutting surfaces. The slide-bar $t'$ is prolonged, as at $t^4$, beyond the cam portion $t^2$, $t^3$, and is recessed along one edge to receive therein a pivoted latch $t^5$ having a cam portion $t^6$ projecting beyond the recessed edge of the part $t^4$, see Figs. 7 and 7a, said latch normally being retained in the position shown in Fig. 7a by a suitable spring $t^7$ held in the recess. The extremity of the prolongation $t^4$ is bifurcated or forked as at $t^8$, and the opening formed is closed at times by the hooked end of the latch $t^5$, as shown in Fig. 7a, and the latch is withdrawn from said opening by a pin or projection $t^9$ in the path of movement of the cam $t^6$ when the slide-bar $t'$ is retracted, as has been described, Fig. 7 showing the latch as withdrawn from the forked opening in the end of the prolongation $t^4$. The parts being, as shown in Figs. 1 and 2, with the presser $f^2$ raised, the work is placed upon the bed-plate and the machine started, whereupon the presser will be lowered by the action of the spring 7 thereon, the cam $g$ permitting such descent. At the same time the needle $h$, carrying a loop of cord $t$, descends by the action of the cam F upon the roller or other stud $h^4$ on the needle-bar, carrying the needle and its loop through the material and below the base-plate into position to be engaged by the loop-taker $e^4$ for formation of the first knot. As the shaft E is rotated in the direction of the arrow Fig. 1, the loop-taker $e^4$ and loop-detainer $e^5$ enter the loop between the needle and the free end of the cord or thread, the sides of the loop, in the continued rotation of the knotter, being carried around the hub $e^7$ thereof, as shown in Fig. 11, the inner side of the loop having been pushed over onto the hub $e^7$ by the loop-turner $e^x$, continued rotation of said knotter causing the loop-detainer to enter between the two sides of the loop held between the hub and the material, the free side of the loop slipping into the space between said loop-taker and loop-detainer, as shown in Fig. 12, the free side of the loop being held by the hooked portion of said detainer, and immediately the direction of rotation of said knotter is reversed, as shown by the arrow in Fig. 13, said reversed motion continuing until the position shown in Fig. 14 has been assumed. The cast-off $s$ passes from the inner to the outer end of the groove $e^8$ during the rotation of the knotter from the position shown in Fig. 12 to that shown in Fig. 14, moving the part of the loop held upon the hub $e^7$ before it until, when the position shown in Fig. 14 has been reached, the same is bodily pushed off from said hub, and the loop formed as shown in said Fig. 14, the bight of the loop being still held on the loop-detainer $e^5$. During the reverse rotation of the knotter in the formation of the knot, as described, the needle has been ascending through the material, and the tension side of the loop is drawn upward, carrying with it the surplus thread or cord until the knot has been formed or laid by the knotter, and also drawing the knot tight, the direction of rotation of the knotter then being reversed and continued until the open portion of the loop-detainer $e^5$ is in such position that the bight of the loop is released therefrom, thus forming the first knot, the same being drawn taut by the continued ascent of the needle. The presser $f^2$ is raised through the action of the cam $g$ as described, and the material is moved to a new position, or in the case of a pair of shoes, the upper of the second shoe is placed upon the base-plate, a sufficient quantity of the cord being drawn off by the operator, according to the length of cord which it is desired shall be between the shoes, and the presser then descends upon the upper preparatory to making the second knot. As the needle again descends through the material of the upper, the loop is presented to and entered by the loop-taker and loop-detainer as has been described for the first knot, the knotter being moved into the position shown in Fig. 15, and during the further rotation of the knotter the slide-bar $o'$ is moved forward by the actuating mechanism described, to turn the plates $p$ and $r$ upon their pivots, as described, whereby the grooved ends $p^3$ and $r'$ of said plates are moved to engage the tension and free sides of the loop, respectively, continued movement of the said plates carrying the tension side across the free side of the loop, as shown in Fig. 16, and retaining it in such position until the loop-detainer $e^5$ enters between the sides of the loop so crossed, the tension side of the loop in this instance being caught under and held by the hook of the loop-detainer $e^5$. While the hereinbefore described movements have been taking place the slide-bar $o'$ has continued to move in a forward direction until the hook $o^2$ has been brought into position to engage the cord drawn through the needle-eye, the needle at such time being raised, and, at the same time that the slide-bar $o'$ has been moved forward, the slide-bar $t'$ has also been moved forward until the part of the free end of the cord between the material and the looper has entered the open or bifurcated end of the prolongation $t^8$, passing the end of the spring latch $t^5$ and being held in the opening by said latch. The slide-bars are then retracted, the bar $o'$ moving a little faster than the bar $t'$, the hook $o^2$ during such movement drawing the cord back over the guard $w$, see Figs. 5, 6 and 7, as the needle ascends, the combined movements of the hook and needle drawing off sufficient cord from the source of supply to form the succeeding knot, which will be of the kind shown in Figs. 11 to 14. After the slide-bar $o'$ has been fully retracted, as described, and while it is held stationary in such retracted position, holding the thread taut between the hook $o^2$ and the needle, the slide-bar $t'$ is retracted, and during such movement the cams $t^2, t^3$ act upon the lever $k'$ to turn it upon its pivot and move the knife $k$ over and to co-operate with the fixed blade $k^5$, the thread or cord being held taut in the path of movement of the movable blade by the hook $o^2$, so that when the two blades are brought together the cord or thread is severed. During such movements of the slide-bars, as described the knotter has moved from the position shown in Fig. 16 into the position shown in Fig. 18, and thence to the position shown in Fig. 18, where the loop has been thrown off of the hub by the cast-off $s$, as herein before described, and a knot laid, as shown in Fig. 18, the bight of the knot being held by the loop-detainer $e^5$, and while the knotter has been moving from the position shown in Fig. 16 to that shown in Fig. 18 the slide-bar $t'$ has been moved rearwardly, drawing up the slack of the free end of the cord until the knotter has reached the position shown in Fig. 18, further retraction of the bar $t'$ tightening the knot preparatory to the release of the bight thereof. The reverse movement of the knotter frees the knot from the loop detainer $e^5$. Just previous to the release of the bight of the knot, and after the knot has been tightened, the cam $t^6$ of the latch $t^5$ strikes against and is moved by a pin or projection $v'$, best shown in Fig. 7, to withdraw the hooked end of the latch $t^5$ from the opening in the bifurcated end of the prolongation $t^4$, thus releasing the free end of the cord at that point. Continued movement of the mechanism raises the presser and the work can be removed. From the foregoing it will be seen that the work is clamped in position, a knot formed on the underside thereof, and the clamp raised preparatory to putting in the second piece of material, which is in turn clamped, and a knot is formed at the underside of such material, such knot, however, being the reverse of the preceding knot, the cord or thread being severed after the formation of every second knot, and a sufficient portion of the cord is drawn off for the formation of the next knot. The knots so formed are "slip" knots, readily untied by pulling upon the free or loose end of the cord forming either knot, any strain upon the cord connecting the knots, however, only serving to draw them tighter.

I do not desire to limit myself to the particular construction or arrangement of parts as herein shown, as the same may be varied without departing from my invention, the gist of which consists in making a series of slip knots from a continuous cord, every second knot being the reverse of the intervening knots, the cord being automatically severed after the formation of every two knots, as described.

It will be understood that the hereinbefore described mechanism may be used for many purposes besides that of tying shoes together in pairs, such as gloves, hose, or any articles capable of penetration by a needle and which are to be united in pairs, or a loop may be formed in a single article by putting two knots therein, or tags, bills, pamphlets or any article which may need to have a string passed through it with a knot at one end or both ends.

I claim—

1. A knot-tying machine containing the following instrumentalities, viz:—an eye-pointed cord-carrying needle to penetrate the material; a work support; a knotter located below the material and co-operating with said needle, and a cast-off to remove the main portion of the knot from the knotter, combined with a reversing or twisting device between the knotter and work support to engage and cross the two sides of the loop of cord held by the knotter intermediate it and the material prior to the formation of every alternate knot, and actuating mechanism for the needle, knotter and reversing or twisting device, substantially as described.

2. A knot-tying machine containing the following instrumentalities, viz:—a cord-carrying eye-pointed needle, a knotter located below and to co-operate with said needle, and a cast-off, combined with a reversing or twisting device to engage and cross the two sides of the loop at times while it is held by the knotter, and a cutting mechanism to sever the cord after the formation of every second knot, substantially as described.

3. A knot-tying machine, containing the following instrumentalities, viz;—a cord-carrying needle, and a knotter located below and co-operating with said needle, combined with fixed and movable blades having their cutting edges in a vertical plane parallel to and located at one side of the needle path, a reciprocating hook adapted to engage the cord and draw taut a portion of the same to one side and from the needle and between the cutting edges of the blades to be severed thereby, and blade actuating mechanism, substantially as described.

4. In a knot-tying machine, a cord-carrying needle, a knotter co-operating with said needle, and a cast-off, combined with a fixed blade having an extension beyond its cutting edge, a pivotally supported co-operating blade held against the fixed blade and its extension in a yielding manner, the cutting edges of said knives being in a plane parallel to the needle path, an independent hook reciprocable at right angles to said blades and adapted to pass between and beyond them when their edges are separated to engage the cord and draw a portion thereof positively between said blades to be severed thereby, and a cam surface to co-operate with and actuate the movable blade, substantially as described.

5. In a knot-tying machine, a fixed cutting blade; a pivoted lever; and a movable blade attached thereto in a yielding manner and adapted to move over the fixed blade combined with a fixed and a movable support on opposite sides of the blade to hold the cord between them to be severed thereby, and a cam surface to actuate the pivoted lever carrying the movable blade, substantially as described.

6. In a knot-tying machine, a cord-carrying needle; a knotter located at right angles thereto and co-operating therewith; cutting blades; and a device to draw off from the needle a length of cord sufficient for the next knot and to draw the cord intermediate the needle and knotter tightly between said blades; combined with a movable fork having a normally closed latch, means to reciprocate said fork to engage the free end of the cord between the material and the knotter and tighten every second knot, and mechanism to open said latch to release the cord, substantially as described.

7. In a knot tying machine, a knotter provided with a loop-taker, a loop-detainer adjacent thereto and inclined toward it, an extended hub, to the inner end of which said loop-taker and loop-detainer are rigidly secured side by side, and a rearwardly curved loop-turner behind the loop-taker, combined with a knotter shaft, and means to oscillate the same, substantially as described.

8. In a knot-tying machine, an oscillating knotter comprising a loop-taker, a loop-detainer, and a loop turner having a curved portion, and an extended hub provided with a spiral groove, combined with a cast-off engaged and actuated by said grooved hub to remove the knot from the knotter, substantially as described.

9. In a knot-tying machine, a main shaft, a cam $C^2$ thereon, a toothed sector lever actuated thereby, a knotter shaft, a gear thereon to engage said toothed sector lever, whereby the knotter shaft is oscillated by said lever, a presser, a needle-bar guided thereby, and operative connections between them and said main shaft, combined with a cam shaft geared to said main shaft, knot twisting or reversing plates and cutting devices, and connections between them and said cam shaft, to operate substantially as described.

10. In a knot-tying machine, fixed and movable cutting blades, a recessed slide bar having a cam surface to actuate the movable blade, a knot twisting or reversing device comprising pivoted plates, a stud on one to engage a forked portion in the other, and a slide-bar guided by said recessed bar to actuate the reversing or twisting device, combined with means to reciprocate said slide-bars independently, substantially as described.

In testimony whereof I have signed my name to this specification in the presence of two subscribing witnesses.

WILLIAM H. BORDEN.

Witnesses:
 AUGUSTUS M. FAY,
 GERTRUDE E. MORGAN.